Aug. 2, 1955  M. J. ZUCROW  2,714,286
LIQUID PROPELLANT INJECTION SYSTEM FOR JET MOTORS
Filed July 14, 1944  3 Sheets-Sheet 1

INVENTOR.
MAURICE J. ZUCROW
BY
Christie & Angus
ATTORNEYS.

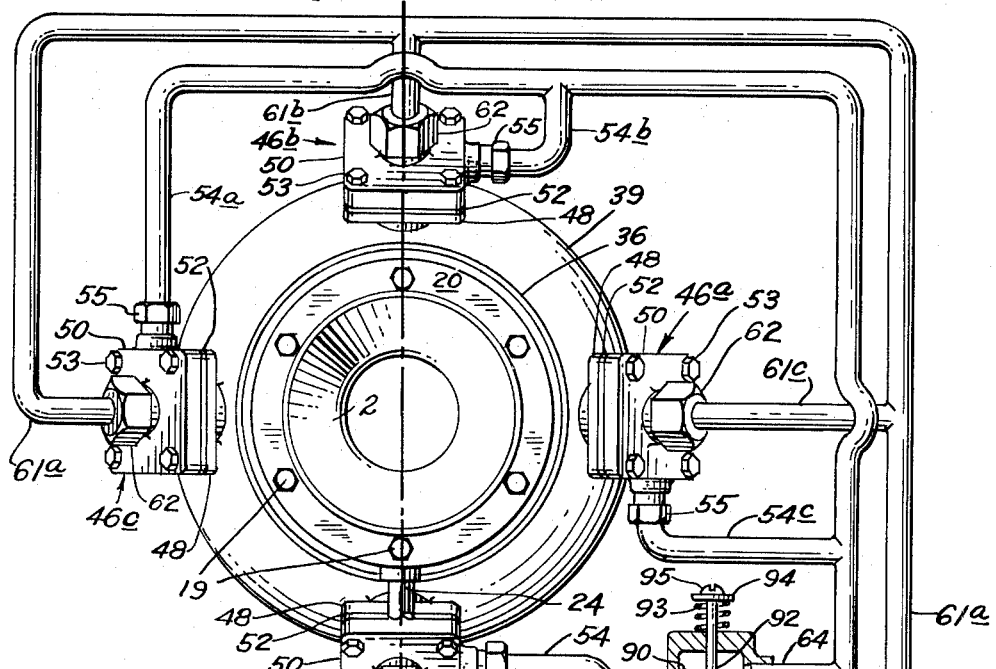

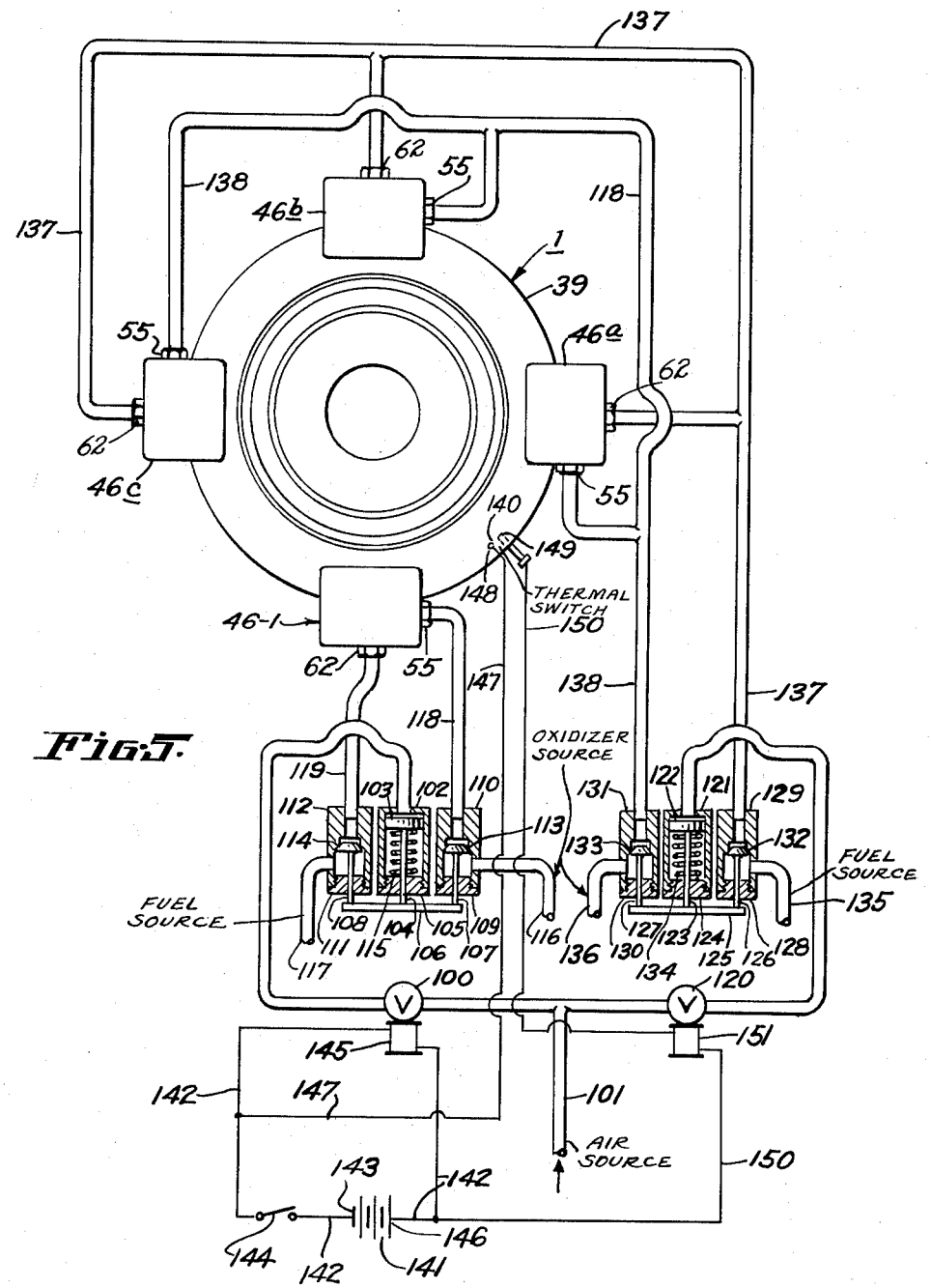

United States Patent Office 2,714,286
Patented Aug. 2, 1955

2,714,286

LIQUID PROPELLANT INJECTION SYSTEM FOR JET MOTORS

Maurice J. Zucrow, Altadena, Calif., assignor, by mesne assignments, to Aerojet-General Corporation, Azusa, Calif.

Application July 14, 1944, Serial No. 544,868

4 Claims. (Cl. 60—35.6)

This invention relates to jet propulsion motors and methods for operating the same and has for its object the improvement of the operating performance of such motors.

Jet propulsion motors have heretofore been operated by burning fuel in a combustion chamber and causing the ensuing products of combustion to be ejected through an exhaust nozzle to create the propulsion force.

Good performance has been obtained by injecting two propellant liquids into the combustion chamber, one a fuel and the other an oxidizer for the fuel; for example, aniline has been used as a fuel and red fuming nitric acid as an oxidizer. These two liquids have been injected separately into the combustion chamber and caused to impinge upon each other, whereupon spontaneous combustion takes place, liberating a large amount of gases which escape through the exhaust nozzle in the form of a jet.

In the systems heretofore used the liquid propellants have been forced into the combustion chamber through injection apparatus designed to feed the full flow of the propellants required to maintain the motor in full operation. This full flow of propellants has been found to have the disadvantage, in starting up the motor, in that when a large amount of propellant is suddenly injected into the cold combustion chamber, all of the propellant does not immediately combust. This failure immediately to combust has caused an undesirably large accumulation of unburned propellant in the chamber which finally does ignite, producing such a great explosive force as to endanger the motor itself or blow out its safety devices. In either case th motor is rendered inoperative until reconditioned.

In accordance with my invention I provide a plurality of propellant injectors, each introducing only a small proportion of the total amount of propellant fed into the combustion chamber of the motor. When starting the motor, I put into operation only one or a part of the total number of propellant injectors, thereby permitting only a part of the full propellant flow to be introduced into the motor. Ignition accordingly occurs in the presence of an amount of propellant which is not excessive, after which the full flow of propellant may be turned on without danger.

According to one feature of my invention I use a hand operated distributing valve which controls the operation of the motor by first permitting the propellants to enter the combustion chamber through a single injector or a number of injectors less than the total number. By manipulation of this valve the propellants may be forced through all injectors, after starting the ignition through only one or some of them.

According to an alternative feature of my invention I may use instead of the hand operated valve, a thermo electric controlled valve which introduces the full operating amount of propellants into the combustion chamber after the combustion chamber has been sufficiently warmed by the combustion of the smaller amount of propellant.

My invention will be better understood from the following description when taken in conjunction with the drawing in which:

Fig. 2 is an end view of the motor looking into the nozzle end with respect to Fig. 1;

Fig. 3 is a part end view of a distributing valve embodied in the motor;

Fig. 4 is a cross sectional view at line 4—4 of Fig. 1; and

Fig. 5 is a schematic view showing the valve and conduit system associated with the motor.

Similar numerals refer to similar parts in the views.

Figure 1:
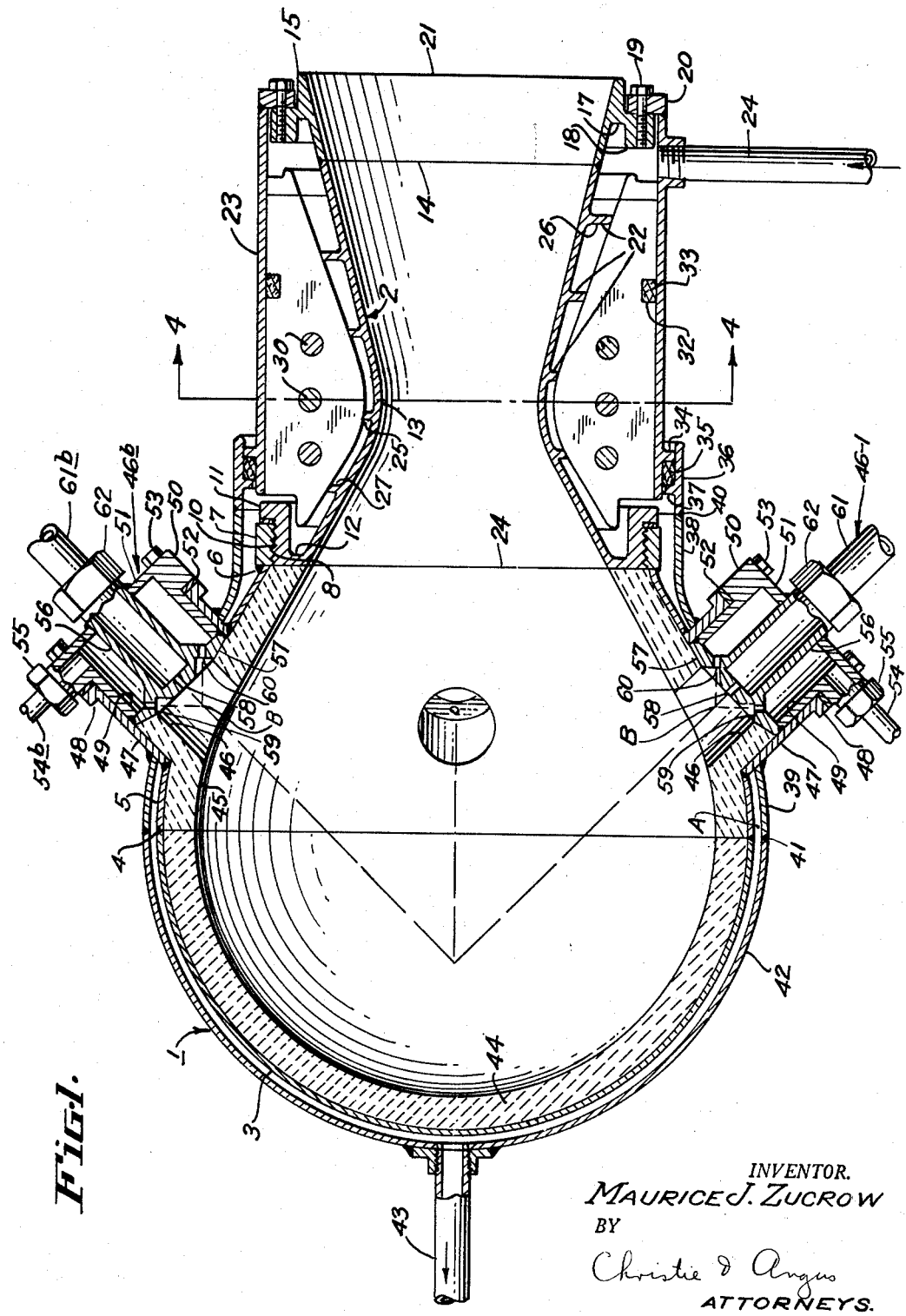
Fig. 1 is an elevational view in cross section of a jet propulsion motor embodying my invention, the section being taken at line 1—1 of Fig. 2.

The motor shown in Figs. 1 and 2 comprises a combustion chamber formed by the wall 1 in the shape of a portion of a sphere, and an exhaust nozzle 2 protruding from the chamber. The combustion chamber may be made of a suitable metal such as steel and may conveniently be of two parts, as shown, there being a hemispherical portion 3 which is welded to the other portion 5 at 4. The portion 5 is somewhat elongated and contains a flange 7 welded thereto at 6. Flange 7 contains internal threads 8 into which the exhaust nozzle 2 is screwed. For this purpose the exhaust nozzle 2 has a collar 10 provided with threads and a shoulder flange 11, the shoulder flange 11 being recessed as shown at 12. The wall of the exhaust nozzle 2 contracts toward a constricted portion 13 from the recess 12, and from the constricted portion 13 the nozzle flares outwardly to an enlarged opening 14. Another flange 15 welded at 16 to the enlarged portion 14 continues substantially the general outline of the exhaust nozzle forming a recess at 17 and a thickened section 18 which provides the necessary material for the threads of the screws 19. The flange 15 is machined to receive bolt ring 20 and machined to complete the general outline of the exhaust nozzle at 21.

In Figs. 1, 2 and 4 the exhaust nozzle is shown as being surrounded by a jacket 23 arranged to provide a fluid flow spirally from an inlet 24 for cooling liquid at the extreme end of the exhaust nozzle toward a chamber A around the combustion chamber. A spiral member 22 formed integrally with the wall 2 of the exhaust nozzle, or welded to it, forms this spiral passage. At the front end 21 of the exhaust nozzle the area of the fluid passage is larger than at the throat 13 of the exhaust nozzle. The construction accomplishes this by the fact that at the throat 13 the height of the convolutions of the spiral, for example, convolution 25 is less away from the throat than convolution 26 on one side and 27 on the other. A pair of solid members 28 and 29 are placed around the spiral at the nozzle, the two halves being bolted together by bolts 30 (Fig. 4) which are secured in place by nuts 31 (Fig. 4). The inner curved surfaces of members 28 and 29 fit snugly against the edges of the spiral so that the fluid passageway at the throat 13 (Fig. 1) near convolution 25 has less area than near the more remote convolutions 26 and 27. The outer cylindrical surfaces of members 28 and 29 match the inner surface of the jacket 23. One or a plurality of grooves 32 are machined around members 28 and 29 and into each groove an O ring 33 is snapped providing a fluid tight contact between members 28 and 29 and the tubular jacket 23. The coolant inlet 24 communicates with the spiral convolution which is nearest to the end of the exhaust nozzle 2. The tubular jacket 23 is welded to the bolt ring 20. By inserting screws 19 through the bolt ring 20 and screwing them into the flange 15 the exhaust nozzle is thereby removably fastened to the tubular member 23.

The tubular member is provided with a protruding ring 34 which acts as a retainer on one side for another O ring 35. The O ring 35 fits between the tubular member 23 and another tubular member 36 which surrounds member 23. Tubular member 36 contains another ring 37 protruding towards the center of member 36. Ring 37 acts as another retainer for the O ring 35. A tubular member 38 suitably welded or attached to member 36, flares outwardly to form a spherical jacket 39 conforming with and surrounding the member 5 of the combustion chamber. The space between the chamber and outer jacket 39 is the chamber A, adapted to receive and contain the liquid received from the spiral convolutions 22. Another hemispherical member 42 is welded at 41 to the elongated member 39. Continuation of chamber A is provided between the members 3 and 42.

In the extreme portion of the hemispherical member 42 there is provided an outlet 43 for the coolant liquid. A refractory liner 44 is placed against the inner wall of the hemispherical portion 3 of the combustion chamber and held in place by the inserted refractory liner 45 which is held in place by collar 10 of the exhaust nozzle.

The refractory liners may be of any suitable refractory material, for example, tungsten, tungsten carbide, silicon carbide, boron carbide, calcium oxalate, carbon (graphite), magnesium oxide, molybdenum carbide, zirconium carbide, zirconium oxide or any other standard refractories such as mullite, Transite, mixture of carbon and asbestos, or other like substances.

The jacket arrangement including the means for carrying the cooling fluid, just described, is disclosed and claimed in my copending application Serial No. 605,305, filed July 16, 1945, now Patent No. 2,508,590, dated May 23, 1950, which is a division of the present application.

A plurality of propellant injectors are provided, two of which are shown in detail. For a simplified description I select the upper injector 46b shown in the drawing. At a portion of the member 39 a tubular member 47 having a rectangular flange 48 is welded thereto. The tubular member 47 projects through chamber A into the hemispherical member 5 to which it is also welded.

Another tubular member 49 having in one end a wall 51 and a rectangular flange 50 is inserted into the tubular member 47. Flange 50 of the tubular member 49 is seated on a gasket 52 and secured to flange 48 of the tubular member 47 by a plurality of screws 53. A flared nipple (not shown) is provided in the left hand side of flange 48 to which a conduit 54b may be attached in the conventional manner and secured thereto with nut 55. A tubular member 56 having an enlarged flat disc 57 on one end is welded in its extreme cylindrical portion to the tubular member 49. Disc 57 has a concentric orifice 58 and an annularly machined groove forming a conical surface 59 having two or more orifices 60 therein. The other end of member 56 is flared (not shown) having a threaded portion below the flare for attaching a conduit 61b securing it with nut 62.

When the injectors are mounted on flanges 48, provided on the outside wall of motor 1, the position of the orifices 58 and 60 is such that the stream of liquids discharging therefrom will travel towards the forward portion of the motor and away from the exhaust nozzle intersecting each other at a point B where the reaction commences to take place. The resulting flame, products of combustion, and unburned particles of fuel and oxidizer are then projected towards a common point near the forward end of the firing chamber indicated by the intersection of the broken lines coming from the center of each injector, as shown in Fig. 1, thus permitting the flames to come in contact with the forward portion of the refractory liner 44. The effect of positioning the injectors in this manner is to make the streams of unreacted fuel and oxidizer and other reaction products travel an additional distance between the reaction zone B and the throat 13 of the nozzle thereby increasing the time required for them to leave the reaction chamber and making possible a more complete reaction.

Concentrating the flames upon the refractory liner at its forward region transfers a considerable portion of the heat of reaction to the liner wall raising its temperature to a level sufficient to initiate the combustion of any unreacted material which may escape from the primary reaction zone B.

Preheating the liner is particularly desirable when the motor is being started from a relatively cold condition. This is generally done by operating a single injector until the temperature of the refractory liner has been elevated sufficiently to insure the instant ignition of any unburned materials. After the desired temperature has been reached then any or all of the remaining injectors may be placed in operation.

Fig. 2 discloses the particular arrangement of the conduits and shows the motor having three injectors 46a, 46b and 46c which are situated one at the top and one each on either side of the motor. At the bottom of the motor another injector 46–1 is shown, this being arranged to operate independently of the other three injectors. A distributing valve 65 having a body 66 is shown in the right hand lower portion of the drawing. A conical plug 67, having two vertical orifices 68 and 69 and two orifices 70 and 71 offset at a 60° angle with the vertical orifices, is shown inserted into the body 66 and held in position by spring 72 secured by the threaded cap 73. Four vertical holes are provided passing through the body 66 and corresponding with the four holes provided in the conical plug 67. An operating member 75 is attached to the turned down cylindrical portion 74 of the conical plug 67. Distributing valve body 66 is in communication with the fuel source (not shown) by conduit 76 branching out into 76a and in further communication with an oxidizer source (not shown) by conduit 77 having a second branch 77a. Conduit 61 permits fuel to pass through the lower chamber 78 of a pressure controlled member 79 into the fuel inlet of the injector 46–1. Conduit 54 leads the flow of the oxidizer through the lower chamber 88 of another pressure controlled member 87 into the oxidizer inlet of the injector 46–1.

The pressure controlled valve members 79 and 87 are substantially alike in every detail, each having a lower chamber 78 and 88 respectively and an upper chamber 81 and 90 respectively. The lower chamber of each valve has an inlet and outlet which permit the fuel and oxidizer respectively to pass through into the first injector 46–1. The upper and lower chambers are separated by central members, 80 and 89 respectively, each having a valve seat. Valves 82 and 91 are held in place against their corresponding valve seats in their respective valves by springs 84 and 93 respectively. Springs 84 and 93 are secured upon the respective valve stems 83 and 92 abutting against the upper wall of the respective valves and secured by washers 85 and 94 which are held in place by screws 86 and 95.

Branch conduit 76a establishes another communication between the fuel source (not shown) and the distributing valve 65. Conduit 61a connects the other side of the valve 65 with the fuel inlet of the injector 46c. A branch conduit 63 connects conduit 61a and the upper chamber 81 of the pressure controlled valve 79, branch 61c connects conduit 61a and the fuel inlet of injector 46a and branch 61b connects conduit 61a with the fuel inlet of the injector 46b.

Branch conduit 77a connects the oxidizer source (not shown) with the distributing valve 65. Opposite to the branch conduit 77a in the distributing valve a conduit 54a connects valve 65 with the oxidizer inlet of the injector 46c. A branch conduit 64 is in contact with conduit 54a and the upper chamber 90 of the pressure controlled valve 87. Another branch conduit 54c connects conduit 54a and the oxidizer inlet of the injector 46a. And still another branch conduit 54b establishes contact of conduit 54a and the oxidizer inlet of injector 46b.

When operating the system illustrated in Fig. 2, the distributing valve 65 is placed into the position as indicated in the drawing, thereby permitting the fuel to flow through conduit 61 and the fuel inlet of injector 46–1 into the combustion chamber of the motor; and the oxidizer flows through conduit 54 and the oxidizer inlet into the combustion chamber, impinging upon the injected fuel. The quantities of the fuel and oxidizer are small enough so that their quick ignition is assured. As soon as the motor warms up and operates satisfactorily the distributor valve handle 75 is turned slowly to position 3 as shown in Fig. 3. The flow of the propellants into the injector 46–1 is gradually decreased and stopped and the fuel is directed to flow through conduit 61a and branch conduit 63 into the upper chamber 81 of the pressure controlled valve 79. As soon as the pressure of the fuel in chamber 81 overcomes the pressure of spring 84 which opens valve 82 the fuel flows through conduit 61 and the fuel inlet of the injector 46–1 into the combustion chamber. The fuel flows simultaneously through conduit 61a and the two branch conduits namely 61c and 61b and the fuel inlets of the three remaining injectors 46a, 46b and 46c into the combustion chamber. The oxidizer is likewise directed to flow through conduit 54a, branch conduit 64 into the upper chamber 90 of the pressure controlled valve 87. As soon as the pressure of the oxidizer in chamber 90 overpowers the pressure of spring 93 which opens valve 91, the oxidizer flows through conduit 54 and the oxidizer inlet of the injector 46–1 into the combustion chamber. The oxidizer flows simultaneously through conduit 54a and the two branch conduits 54b and 54c and the oxidizer inlets of the three remaining injectors 46a, 46b and 46c into the combustion chamber. The oxidizer stream thereby impinges on the fuel stream, of each injector.

The relatively large amount of fuel and oxidizer supplied from the injectors 46a, 46b and 46c will readily ignite since the motor is now hot enough quickly to produce its ignition.

In Figure 5 I show a schematic plan view of a thermoelectric valve control of the propellants for the motor 1 having four injectors, one shown in the lower portion 46–1 and the other three having the designation 46a, 46b and 46c. A first solenoid operated air pressure valve 100 is in communication with the air pressure line 101 and a first air-cylinder 102. First air-cylinder 102 has a piston 103 sliding therein. A piston rod 104 passing through the air-cylinder cap 105 is fastened to a valve operating bar 106, which is in further contact with the respective valve stems 107 and 108. Valve stem 107 passes through the oxidizer valve cap 109 which is fastened into the oxidizer valve body 110. Valve stem 108 passes through the fuel valve cap 111, which is fastened into the fuel valve body 112. Oxidizer valve 113 and fuel valve 114 are held seated against the respective valve seats by the pressure of the spring 115 exerted against the air-piston 103 in the air-cylinder 102. First oxidizer conduit 116 connects the oxidizer source (not shown) with the lower chamber of the oxidizer valve body 110 and likewise the first fuel conduit 117 connects the fuel source (not shown) with the lower chamber of the fuel valve body 112. Oxidizer conduit 118 is in contact with the discharge of the oxidizer valve 110 and the nipple (not shown) of injector 46–1 and held in place by nut 55. Fuel conduit 119 is in contact with the discharge of the fuel valve 112 and the other nipple (not shown) of injector 46–1 and held in place by nut 62. A second solenoid operated air pressure valve 120 is in contact with the air-pressure line 101 and the second air-cylinder 121. Second air-cylinder 121 has a piston 122 sliding therein. A piston rod 123 passing through an air-cylinder cap 124 is fastened to a valve operating bar 125 which is in further contact with respective valve stems 126 and 127. Valve stem 126 passes through the fuel valve cap 128 which is fastened to the fuel valve body 129. Valve stem 127 passes through the oxidizer valve cap 130, which is fastened into the oxidizer valve body 131. Fuel valve 132 and the oxidizer valve 133 are held seated against their respective valve seats by the pressure of the spring 134 exerted against the air-piston 122 in the air-cylinder 121. Second fuel conduit 135 connects the fuel source (not shown) with the lower chamber of the fuel valve body 129 and likewise the second oxidizer conduit 136 connects the oxidizer source (not shown) with the lower chamber of the oxidizer valve body 131. Fuel conduit 137 is in communication with the discharge of the fuel valve 129 and the nipples (not shown) of the three injectors 46a, 46b and 46c, and held in place by nuts 55 in each of the three injectors. Oxidizer conduit 138 is in communication with the discharge of the oxidizer valve 131 and the other nipples (not shown) of the three injectors 46a, 46b, and 46c and held in place by nuts 55 in each of the three injectors.

A thermal switch 140 is secured in the wall 39 of the motor. A battery 141 is in circuit with the solenoid of the first solenoid operated air-pressure valve 100. Electric conductor 142 connects a master switch 144 with one battery terminal 143 and the winding 145 of the first solenoid in valve 100 and returns to the other terminal 146 of the battery 141. Another electrical conductor 147 connects electrical conductor 142 and the terminal 148 of the thermal switch 140. The other terminal 149 of the thermal switch 140 is connected by electrical conductor 150 passing through the winding 151 of the second solenoid in valve 120 to conductor 142.

When operating this system, the master switch 144 is closed, causing current to flow from the battery 141 through the electrical conduit 142, which energizes the solenoid 145 operating the first air-pressure valve 100. This permits the compressed air to move the piston 103 downward. This motion lifts both valves 113 and 114 from their respective seats permitting the oxidizer and the fuel to flow through conduits 118 and 119 respectively and the injector 46–1 into the combustion chamber of the motor. The ensuing impingement at B (Fig. 1) of the fuel and oxidizer causes spontaneous ignition thereof which generates a great mass of products of combustion and heat. This heat tends to close the contacts of the thermal switch 140. When the contacts 148 and 149 close, the current is immediately permitted to pass through conduits 147 and 150, thereby energizing the solenoid 151 which operates the second air-pressure valve 120. The compressed air is permitted to enter the second air-cylinder 121 which moves the piston 122 downward against the pressure of spring 134. This motion is transmitted to the valve stems 126 and 127 thereby lifting the valves 132 and 133 from their respective seats in the two valve bodies 129 and 131, which permit the fuel and oxidizer to flow through their conduits 137 and 138 respectively and the remaining three injectors 46a, 46b and 46c into the combustion chamber. Normal operation of the motor is thereby instituted.

It will be recognized in accordance with my invention, I have provided a system and method for operating a jet propulsion motor in which the motor operation may be initiated by the impingement of any relatively small amounts of the propellant so that starting of the motor occurs quickly without danger from explosion or excessive combustion which might otherwise occur. I have furthermore provided a simple and efficient valve means for changing over from the starting condition of small propellant flow to the full operating condition of full propellant flow, thereby insuring full motor operation without danger or damage from explosion.

I claim:

1. In a motor having a chamber in which combustion takes place and an exhaust nozzle through which the products of combustion flow, a plurality of injectors directing streams of fuel and oxidizer to impinge against each other in the chamber, said impingement causing combustion which produces great amounts of products of combustion and heat, a first solenoid operated pressure valve controlling the pressure for actuating a first pair of fuel and oxidizer valves, said first pair of valves being in communication with a first injector, a second solenoid operated pressure valve controlling the pressure for actuating a second pair of fuel and oxidizer valves, said second pair of valves being in communication with the remainder of the injectors, a voltage source in circuit with said first solenoid, said voltage source having a second contact with a thermal switch in the wall of said combustion chamber and said second solenoid, a main firing switch between said voltage source and said first solenoid arranged so that closing of said main firing switch energizes said first solenoid which directs the flow of said fuel and oxidizer through said first injector into the combustion chamber, said first injector heating said walls of the combustion chamber thereby closing said thermal switch and energizing said second solenoid which directs the flow of the fuel and oxidizer through the remainder of said injectors into the combustion chamber.

2. In a motor having a chamber in which combustion takes place and an exhaust nozzle from the chamber through which the products of combustion flow, a plurality of injectors each having an orifice for injecting a stream of fuel and an orifice for injecting a stream of oxidizer to impinge against each other in the chamber where the fuel is ignited, a first pair of fuel and oxidizer valves connected between the fuel source and the oxidizer source and the fuel and oxidizer orifices, respectively, of the first of said injectors, a second pair of fuel and oxidizer valves connected between the fuel and oxidizer sources and the respective fuel and oxidizer orifices of each of the other injectors, means for actuating said first pair of valves to inject fuel and oxidizer into the first injector, and means for operating the second pair of valves to inject fuel and oxidizer to all the other injectors, said last-mentioned means comprising a thermal switch responsive to the chamber temperature.

3. Apparatus according to claim 2 in which the means for operating the second pair of valves is a thermally operated device associated with the chamber to operate said second pair of valves only after the chamber becomes hot.

4. In a motor having a chamber in which combustion takes place and an exhaust nozzle from the chamber through which the products of combustion flow, a plurality of injectors each having an orifice for injecting a stream of fuel and an orifice for injecting a stream of oxidizer to impinge against each other in the chamber where the fuel is ignited, a first pair of fuel and oxidizer valves connected between the fuel and oxidizer sources and the respective fuel and oxidizer orifices of a first of said injectors, a second pair of fuel and oxidizer valves connected between the fuel and oxidizer sources and the respective fuel and oxidizer orifices of each of the other injectors, a pressure-actuated plunger connected with each of said pairs of valves, a conduit for supplying actuating pressure to each of said plungers, and a pressure valve connected in each conduit for controlling the pressure to each plunger, whereby operation of the pressure valve associated with the plunger of the first of said pairs of valves sends fuel and oxidizer to the first injector, and operation of the pressure valve associated with the second pair of valves sends fuel and oxidizer to the other injectors.

References Cited in the file of this patent
UNITED STATES PATENTS

| Number | Name | Date |
|---|---|---|
| 980,801 | Kraus | Jan. 3, 1911 |
| 1,209,211 | Sands | Dec. 19, 1916 |
| 1,688,435 | Resek et al. | Oct. 23, 1928 |
| 1,743,621 | Quinn | Jan. 14, 1930 |
| 1,806,133 | Thomas | May 19, 1931 |
| 1,857,556 | Lasley | May 10, 1932 |
| 1,879,186 | Goddard | Sept. 27, 1932 |
| 2,217,649 | Goddard | Oct. 8, 1940 |
| 2,325,619 | Lysholm | Aug. 3, 1943 |
| 2,326,072 | Seippel | Aug. 3, 1943 |
| 2,390,806 | Nagel | Dec. 11, 1945 |
| 2,395,114 | Goddard | Feb. 19, 1946 |
| 2,398,201 | Young et al. | Apr. 9, 1946 |
| 2,406,926 | Summerfield | Sept. 3, 1946 |

OTHER REFERENCES

"Astronautics," March 1936, pages 8, 10, 11.